United States Patent
Bagagli et al.

(10) Patent No.: US 9,080,676 B2
(45) Date of Patent: Jul. 14, 2015

(54) POPPET VALVE WITH AN IMPACT DAMPER AND METHOD FOR REDUCING IMPACT WEAR IN HYPER COMPRESSORS

(75) Inventors: Riccardo Bagagli, Florence (IT);
Leonardo Tognarelli, Florence (IT);
Guido Volterrani, Florence (IT);
Michele Sanesi, Florence (IT)

(73) Assignee: Nuovo Pignone S.P.A., Florence (IT)

( * ) Notice: Subject to any disclaimer, the term of this patent is extended or adjusted under 35 U.S.C. 154(b) by 267 days.

(21) Appl. No.: 13/553,056

(22) Filed: Jul. 19, 2012

(65) Prior Publication Data
US 2013/0019745 A1    Jan. 24, 2013

(30) Foreign Application Priority Data
Jul. 19, 2011 (IT) ................................. FI2011A0142

(51) Int. Cl.
*F16K 21/06*  (2006.01)
*F16K 15/02*  (2006.01)
*F04B 39/10*  (2006.01)
*F16K 47/02*  (2006.01)

(52) U.S. Cl.
CPC ........... *F16K 15/026* (2013.01); *F04B 39/1013* (2013.01); *F16K 47/023* (2013.01)

(58) Field of Classification Search
CPC .............................. F16K 15/026; F16K 47/023
USPC ........... 137/514, 514.3, 514.5, 514.7, 561.27, 137/516.29, 540, 533.17, 533.31, 533.21, 137/533.23, 220; 251/64
See application file for complete search history.

(56) References Cited

U.S. PATENT DOCUMENTS

| | | | | |
|---|---|---|---|---|
| 3,048,188 | A * | 8/1962 | Hunter | 137/469 |
| 5,921,276 | A * | 7/1999 | Lam et al. | 137/514.7 |
| 6,796,321 | B2 * | 9/2004 | Vicars | 137/70 |
| 2006/0260693 | A1 | 11/2006 | Chalk et al. | |
| 2010/0024891 | A1 | 2/2010 | Francini | |
| 2011/0005618 | A1 * | 1/2011 | Lin | 137/516.25 |

FOREIGN PATENT DOCUMENTS

EP    1528304 A1    5/2005

OTHER PUBLICATIONS

Burckhardt Compression Reciprocating Compressors for Refineries and Petrochemical Industry, pp. 1-27, at least as early as Aug. 2011.*

(Continued)

*Primary Examiner* — Kevin Lee
*Assistant Examiner* — P. Macade Nichols
(74) *Attorney, Agent, or Firm* — GE Global Patent Operation

(57) ABSTRACT

Disclosed herein is a differential pressure poppet valve comprising: a valve body, the valve body having at least one flow inlet and at least one flow outlet; at least one shutter guide disposed inside the valve body; at least one poppet shutter guided by the shutter guide; at least one flow passage from the flow inlet to the flow outlet, the flow passage being formed between an inside surface of the valve body and an outside surface of the shutter guide and of the poppet shutter. The valve further comprises at least one biasing member configured to bias the poppet shutter towards a closed position so as to block the flow passage through the flow inlet. To reduce impact wear at least a first damper is provided, configured and arranged to at least partly absorb impact energy of the poppet shutter when the poppet shutter opens or closes the flow inlet.

24 Claims, 7 Drawing Sheets

(56) References Cited

OTHER PUBLICATIONS

IT Search Report from corresponding IT Patent Application FI2011A000142 Date as Feb. 28, 2012.

EP Office Action dated Sep. 26, 2013 from corresponding EP Application No. 12176975.6.

* cited by examiner

PRIOR ART

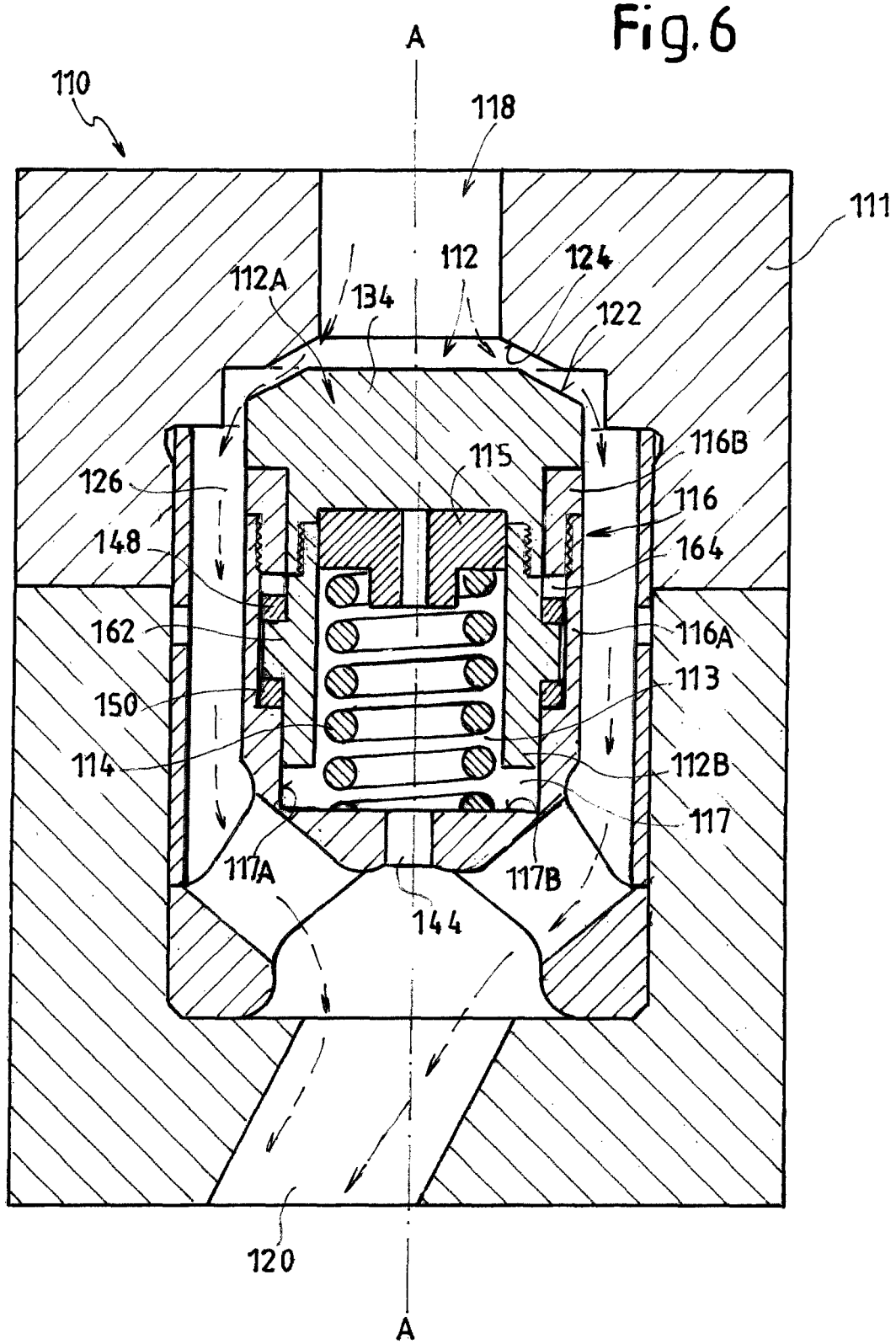

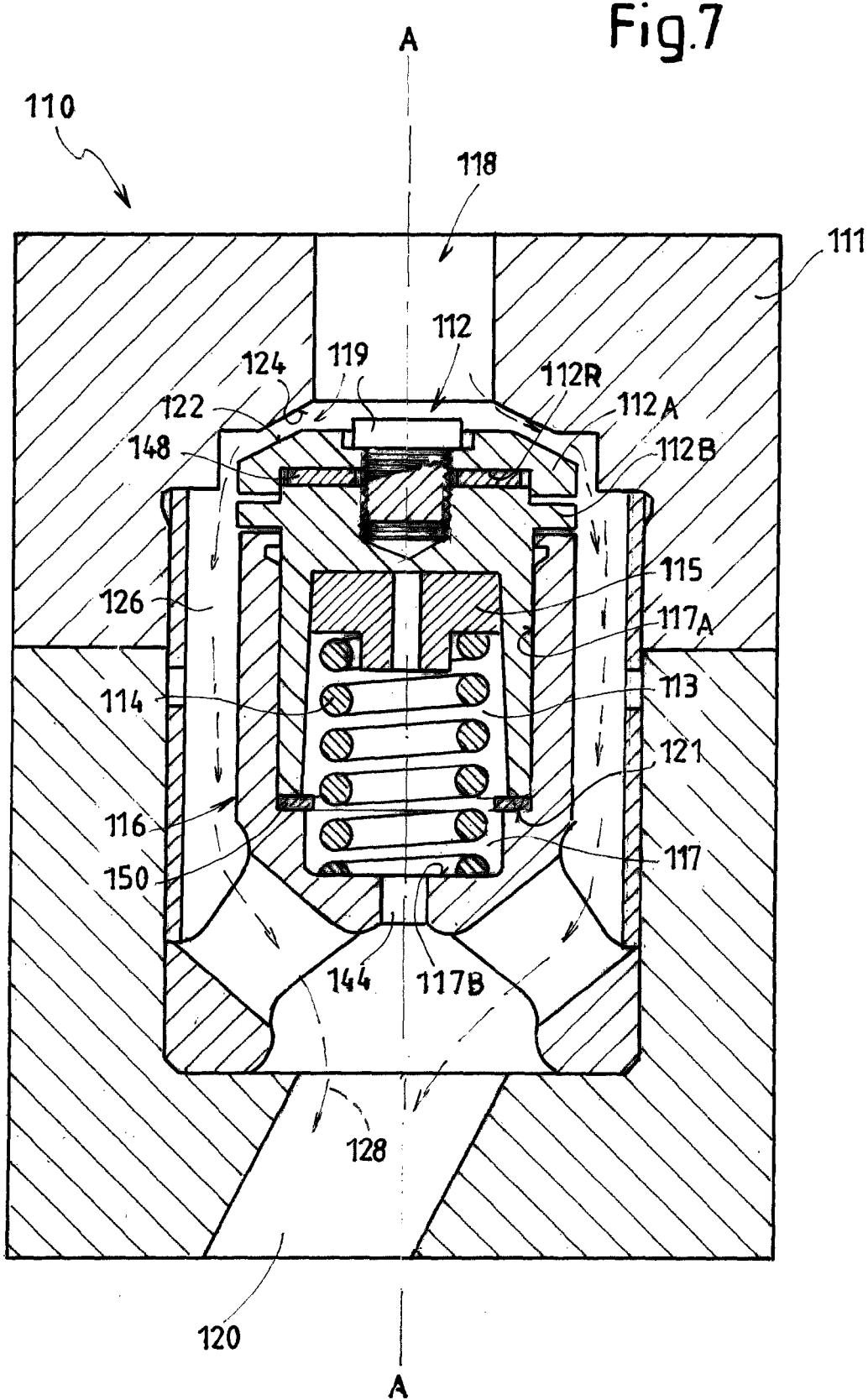

POPPET VALVE WITH AN IMPACT DAMPER AND METHOD FOR REDUCING IMPACT WEAR IN HYPER COMPRESSORS

BACKGROUND OF THE INVENTION

The embodiments disclosed herein relate generally to differential pressure valves, i.e. to self-opening and self-closing valves, including a shutter which opens and closes by effect of the differential pressure across the valve. Typical differential pressure valves are reciprocating compressor valves. Some embodiments specifically refer to poppet valves of hyper compressors.

Hyper compressors, those capable of producing gas pressure levels up to or above 3,000 bars, are widely used in industrial application, including, but not limited to, the production of low density polyethylene, or LDPE. The efficient performance of these compressors is controlled at least in part by suction and discharge automatic poppet valves. FIG. 1 illustrates a cutaway of a portion of a hyper compressor 2 of the conventional art comprising two poppet valves 10. FIG. 2 illustrates an enlarged section of one of the conventional poppet valves of the compressor shown in FIG. 1, in an opened position. A poppet guide according to the state of the art is disclosed in US-A-2010/0024891.

As shown in FIG. 1, a hyper compressor 2 usually comprises a casing 3 in which a cylinder 4 is formed. A piston rod 5 slides reciprocatingly in the cylinder 4 to suck a fluid from a suction duct 6 and discharge the fluid at a higher pressure in a discharge duct 7. A poppet valve 10 is arranged in each of the suction duct 6 and discharge duct 7. In FIG. 1 reference number 10S designates the poppet valve in the suction duct 6 and reference number 10D designates the poppet valve in the discharge duct 7. Each poppet valve 10S, 10D is designed as shown in FIG. 2 and is designated 10 therein.

As shown in FIG. 2, the conventional poppet valve 10 includes a valve body 11 that contains therein a poppet, or poppet shutter, 12 configured to open and close the gas flow path in and out of the hyper compressor 1, a spring 14 configured to keep the poppet shutter 12 in a closed position against a closure seat 13 formed by a portion of the internal surface of the valve body 11, and a shutter guide 16 that contains the poppet shutter 12 and the spring 14. As shown, when the poppet shutter 12 is forced opened, a flow passage 17 (identified by several arrows in FIG. 2) is formed from a flow inlet 18 to a flow outlet 20 of the conventional poppet valve 10, the flow path being defined by the space formed between the poppet shutter 12 and the valve body 11 as well as between the shutter guide 16 and the valve body 11. The shutter guide 16 of the conventional poppet valve 10 further includes a discharge opening 22 along an axis A-A of the shutter guide 16 connecting an inside chamber 26 of the shutter guide 16 to the flow passage 17 in a region of flow stagnation, the back pressure in the inside chamber 26 being defined at least in part by the static pressure in the region of the flow passage 17 around the axis A-A of conventional poppet valve 10.

Opening and closing of the poppet valves 10, 10S, 10D is automatically controlled by differential pressure across the valves. These valves are therefore sometimes called "automatic valves" and distinguish over controlled valves, such as those commonly used in internal combustion engines where valve opening and closing is controlled by an external actuator, such as by sway of a cam shaft.

The suction poppet valve 10S is arranged such that it opens when the pressure in the cylinder 4 of the hyper compressor 2 diminishes during the suction stroke of the piston rod 5. The pressure in the suction duct 6 overcomes the force of the spring 14; the differential pressure across the valve causes opening of the valve and fluid is sucked in the compressor cylinder 4. The discharge valve 10D is closed. Once the piston rod 5 reaches the bottom dead center, the movement is reversed and compression of the fluid in the cylinder starts. Increased pressure in the cylinder 4 automatically closes the suction valve 10S and opens the discharge valve 10D when the differential pressure across the discharge valve 10D, between the compressor cylinder 4 and the discharge duct 7, overcomes the force of the relevant spring.

At each closing movement the poppet shutter 12 of the relevant poppet valve 10, 10S, 10D strikes violently against the seat 13 of the valve body 11 and each opening stroke causes the poppet shutter 12 to strike against the shutter guide 16.

These poppet valves play an important role in the reliability of hyper compressors used in plants for the production of LDPE. The performance of such valves depends not only on selected material properties and a suitable design to withstand high operating gas pressures, but also on a proper dynamic behavior of the poppet shutter 12. The proper opening and closing of the valve are influenced by various design constraints related to several dynamic forces acting on the valve, including a drag force acting on the poppet shutter 12 and shutter guide 16 to open the valve, this drag force being generated by the interaction of the gas flow with the noted valve parts; a gas pressure force acting on the shutter guide 16 to close the conventional valve 10, this gas pressure force being generated by the flow back pressure acting on a back surface of the shutter guide 16; an inertia force associated with the mass of the poppet shutter 12; and a spring force generated by the spring 14 to close the valve, among others.

Hyper compressors operate usually in a speed range between 150 and 300 rpm. At each cycle all the valves perform an opening and closing movement with corresponding impacts of the poppet shutter against the seat 13 and against the shutter guide 16. Repeated impacts cause impact wear and frontal damages, which eventually lead to poppet failure. Impact wear causes material consumption and surface irregularities that can create favorite sites for the formation of cracks. These can propagate by impact fatigue due to the stress waves generated by dynamic loads caused by impacts, till final fracture of the poppet shutter. In case of high impact velocities, impact fatigue can nucleate cracks itself, even in the absence of impact wear.

In case of spring failure the impact stresses on the poppet shutter 12 can increase dramatically and lead to failure of the valve within short times since the impact velocities increase.

It would therefore be desirable to develop an improved differential pressure valve, and specifically a poppet valve for a hyper compressor that will have a higher resistance to impact wear, frontal damages and impact fatigue and therefore less prone to failure.

BRIEF DESCRIPTION OF THE INVENTION

According to an embodiment of the present invention, a poppet valve is provided. The differential pressure poppet valve comprises a valve body, the valve body having at least one flow inlet and at least one flow outlet; at least one shutter guide disposed inside the valve body; at least one poppet shutter guided by the shutter guide; at least one flow passage from the flow inlet to the flow outlet, the flow passage being formed between an inside surface of the valve body and an outside surface of the shutter guide and of the poppet shutter; at least one biasing member configured to bias the poppet shutter towards a closed position so as to block the flow passage through the flow inlet; at least a first damper configured and arranged to at least partly dissipate or absorb impact energy of the poppet shutter when the poppet shutter opens or closes the flow inlet.

According to another embodiment, a hyper compressor is provided. The hyper compressor comprises a cylinder, a piston sliding in the cylinder, a suction duct and a discharge duct, at least one poppet valve arranged in the suction duct and in the discharge duct. The at least one poppet valve comprises a valve body, the valve body having at least one flow inlet and at least one flow outlet, at least one shutter guide disposed inside the valve body, at least one poppet shutter guided by the shutter guide, at least one flow passage from the flow inlet to the flow outlet, the flow passage being formed between an inside surface of the valve body and an outside surface of the shutter guide and of the poppet shutter, at least one biasing member configured to bias the poppet shutter towards a closed position so as to block the flow passage through the flow inlet, and at least a first damper configured and arranged to at least partly dissipate or absorb impact energy of the poppet shutter when the poppet shutter opens or closes the flow inlet. The opening and closing of the poppet valves is controlled by differential pressure across the valve generated by the piston motion inside the cylinder.

According to another embodiment, a method for reducing impact stresses in a differential pressure poppet valve is provided. The differential pressure poppet valve comprises a valve body, the valve body having at least one flow inlet and one flow outlet; at least one shutter guide disposed inside the valve body; at least one poppet shutter guided by the shutter guide; at least one flow passage from the flow inlet to the flow outlet, the passage being formed between an inside surface of the valve body and an outside surface of the shutter guide and of the poppet shutter; at least one biasing member configured to bias the poppet shutter toward a closed position, so as to block the flow passage through the flow inlet. The method comprises providing at least a first damper, and absorbing or dissipating through the first damper at least part of the impact energy of the poppet shutter upon closing or opening of the poppet valve.

According to another embodiment, a method for operating a reciprocating hyper compressor is provided. The compressor comprises a cylinder, a piston sliding in the cylinder, a suction duct with a suction valve and a discharge duct with a discharge valve, each valve comprising at least one poppet shutter, and at least one biasing member configured to bias the poppet shutter toward a closed position. The method comprises providing at least a first impact damper co-acting with the poppet shutter, reciprocatingly moving the piston in the cylinder to suck a gas in the cylinder at a suction pressure and discharge the gas from the cylinder at a discharge pressure, selectively opening and closing the suction valve and the discharge salve by differential pressure across the valves, and at least partly dissipating or absorbing an impact energy of the poppet shutter upon at least an opening stroke or a closing stroke of the poppet shutter by the at least first damper.

The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 6 illustrates a longitudinal section of a poppet valve in an opened position according to a further embodiment;

FIG. 7 illustrates a longitudinal section of a poppet valve in an opened position according to yet a further embodiment.

DETAILED DESCRIPTION OF THE EXEMPLARY EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

The following detailed description refers to a single poppet valve. It shall however be understood that at least some of the features disclosed herein could be embodied in a multi-poppet valve, i.e. a valve including more than one poppet shutter and relevant shutter guide. For example, a valve stop including a plurality of guides for a plurality of poppet shutters can be used in combination with a valve seat with a plurality of suction openings, each corresponding to a respective poppet shutter.

Figure 1:
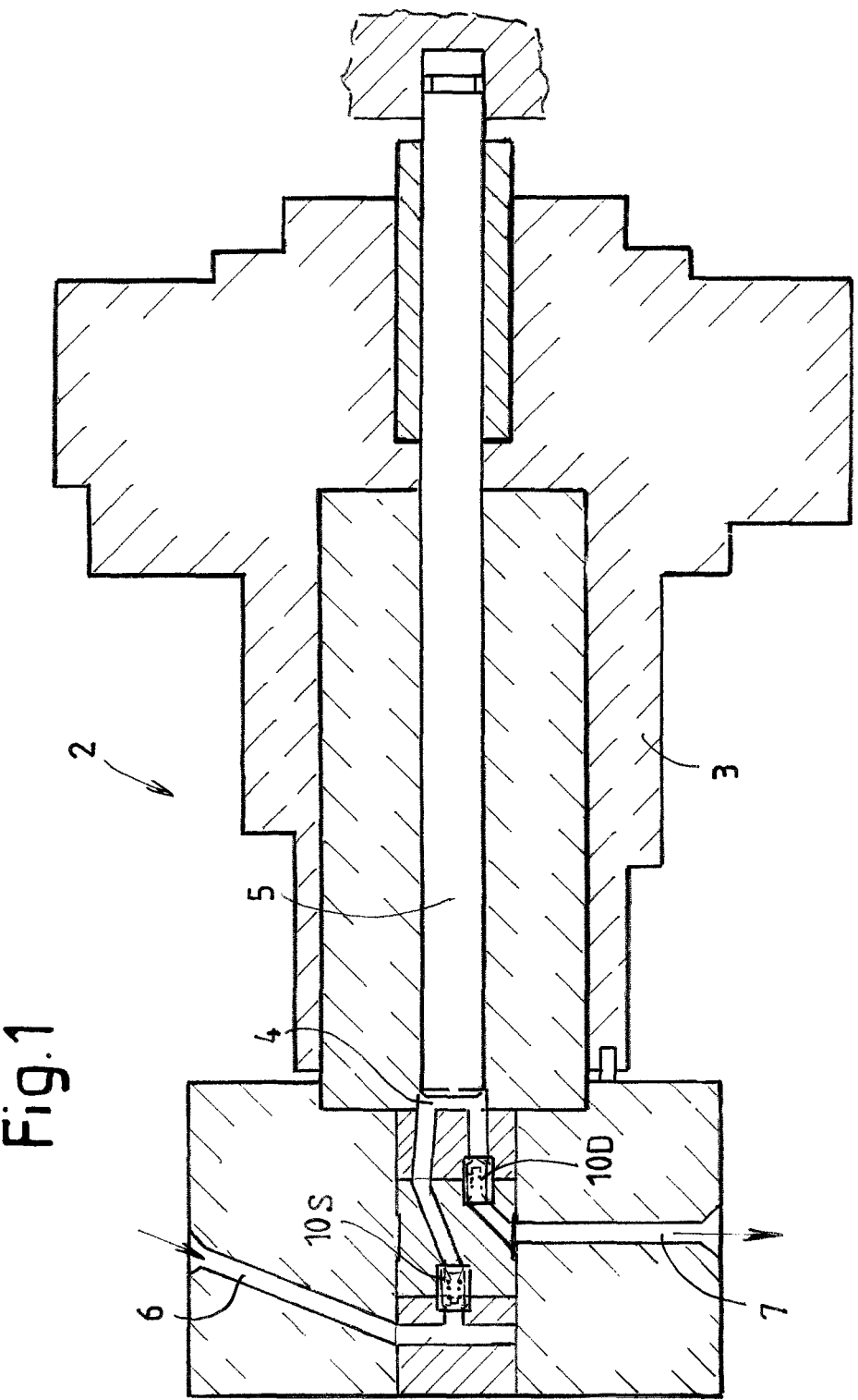
FIG. 1 shows a section of a portion of a reciprocating hyper compressor according to the state of the art.
Figure 2:
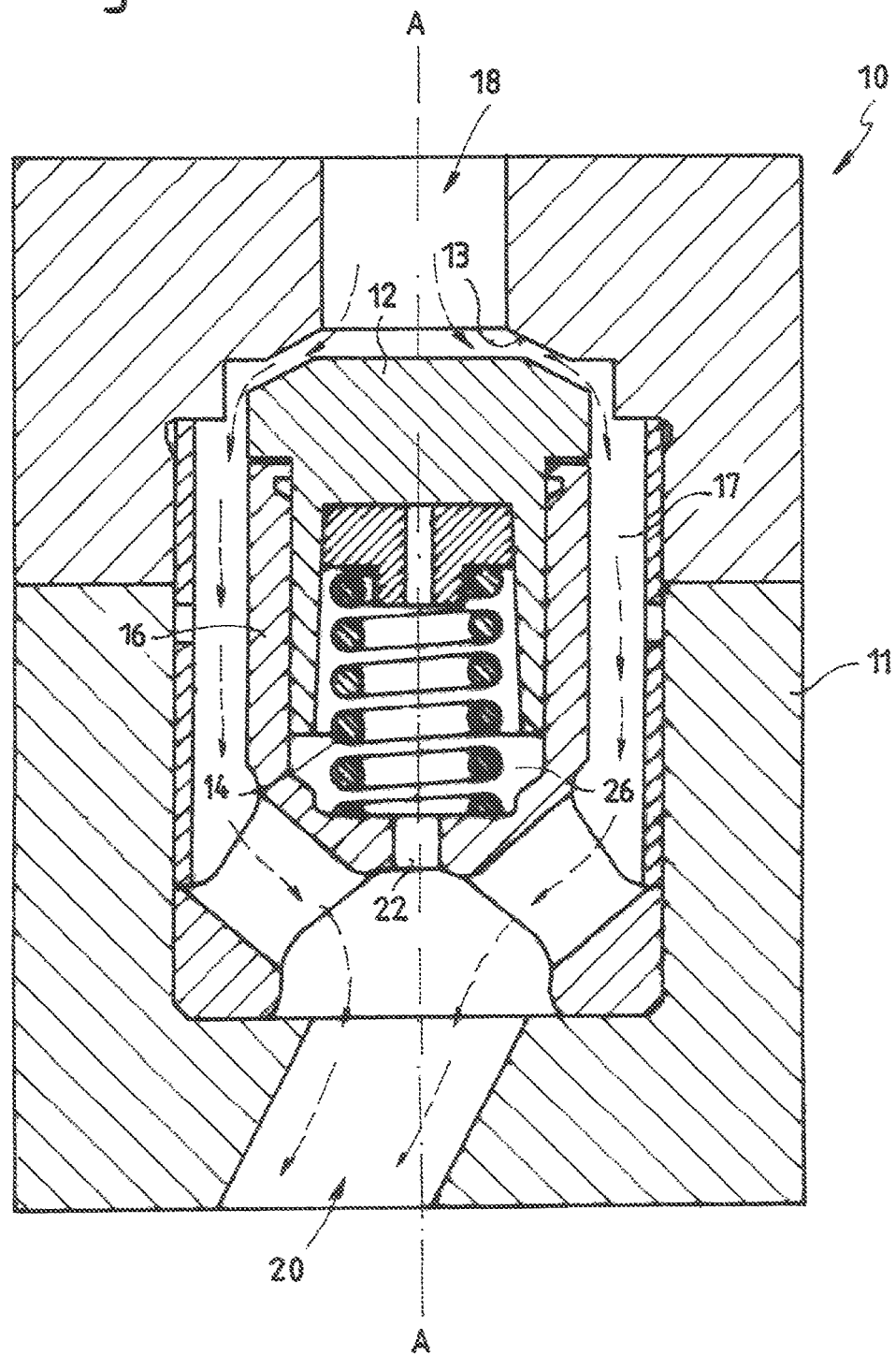
FIG. 2 illustrates a section along a longitudinal axis of a poppet valve for a hyper compressor according to the state of the art.
Figure 3:
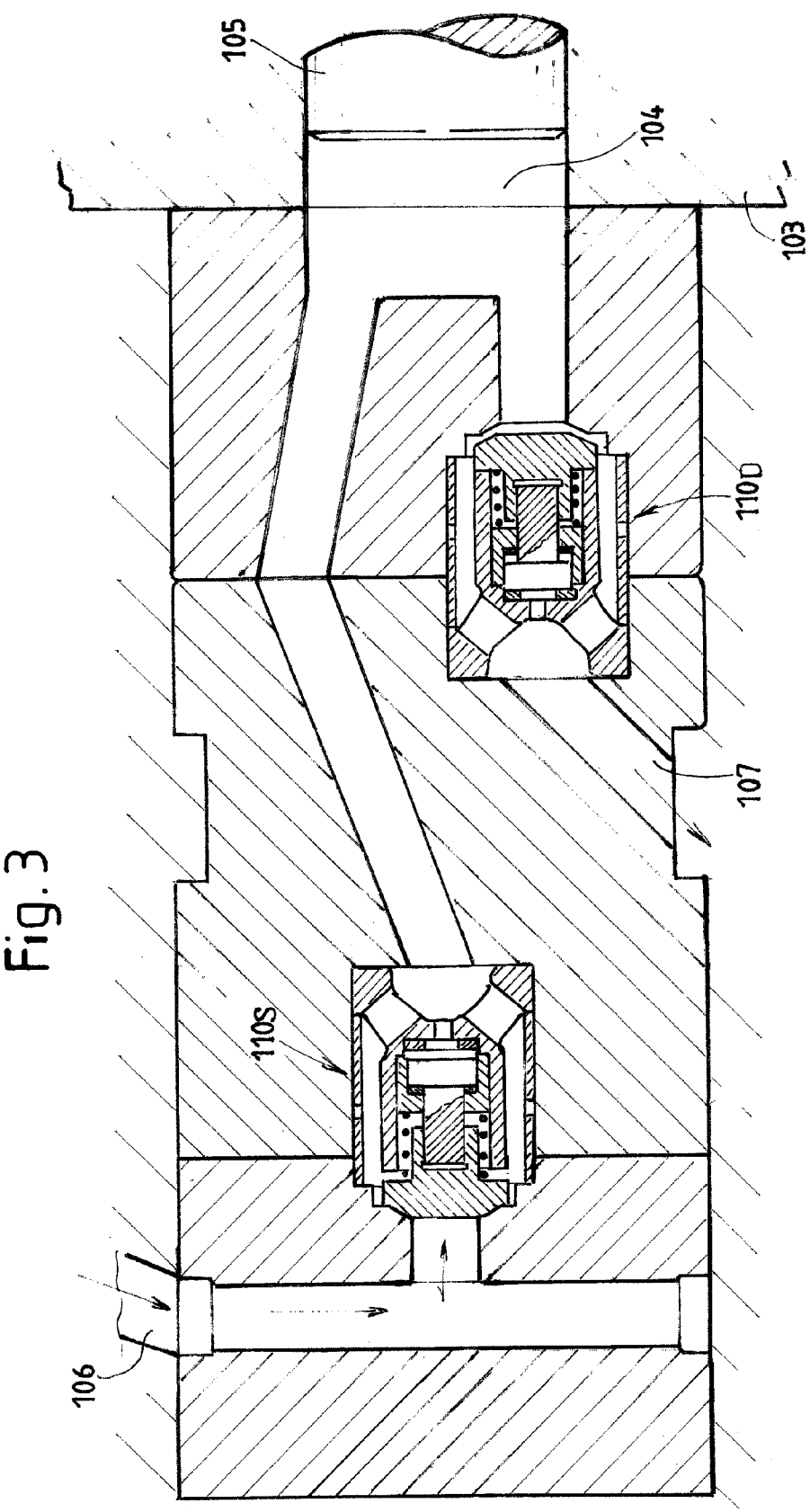
FIG. 3 illustrates a longitudinal section of a portion of a hyper compressor according to an exemplary embodiment.

Referring first to FIG. 3, the general structure of a hyper compressor will be described, limited to those parts which are important for an understanding of the invention. The hyper compressor 102 comprises a casing 103 in which a cylinder 104 is formed. A piston rod 105 slides reciprocatingly in the cylinder 104 to suck a fluid from at least one suction duct 106 and discharge the fluid at a higher pressure in at least one discharge duct 107. A respective poppet valve is arranged in each of the suction duct 106 and discharge duct 107 respectively. Reference number 110S designates the poppet valve in the suction duct 106 and reference number 110D designates the poppet valve in the discharge duct 107. The arrangement of the suction duct and the discharge duct with respect to the cylinder 104 can be different from that shown in the drawings. In particular, the position of the valve axes with respect to the cylinder axis can be different and can depend upon the design values of the inlet and outlet pressure of the hyper compressor.

The piston rod 105 is actuated by a crank (not shown). In some embodiments the rotary speed of the crank is in the range between 150 and 300 rpm, i.e. the piston rod 105 performs a complete compression-suction movement 150-300 times/minute. Consequently, each valve 110S, 110D performs an opening-closing movement between 150 and 300 times/minute. The discharge pressure of the compressor ranges between 800 and 4000 bar, for example between 1500 and 3500 bar.

Figure 4:
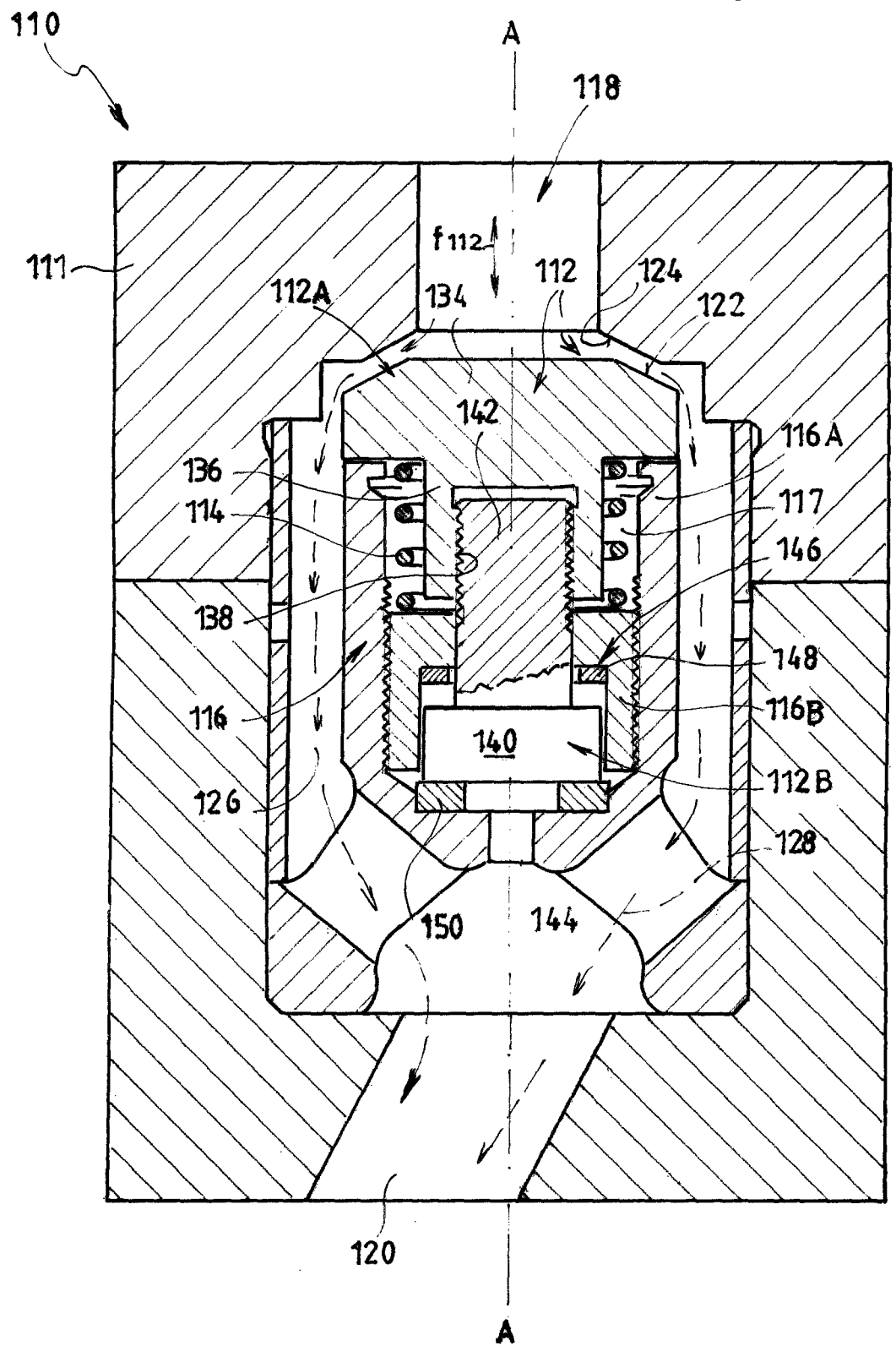
FIG. 4 illustrates a longitudinal section of a poppet valve in an opened position according to an exemplary embodiment.
Figure 5:
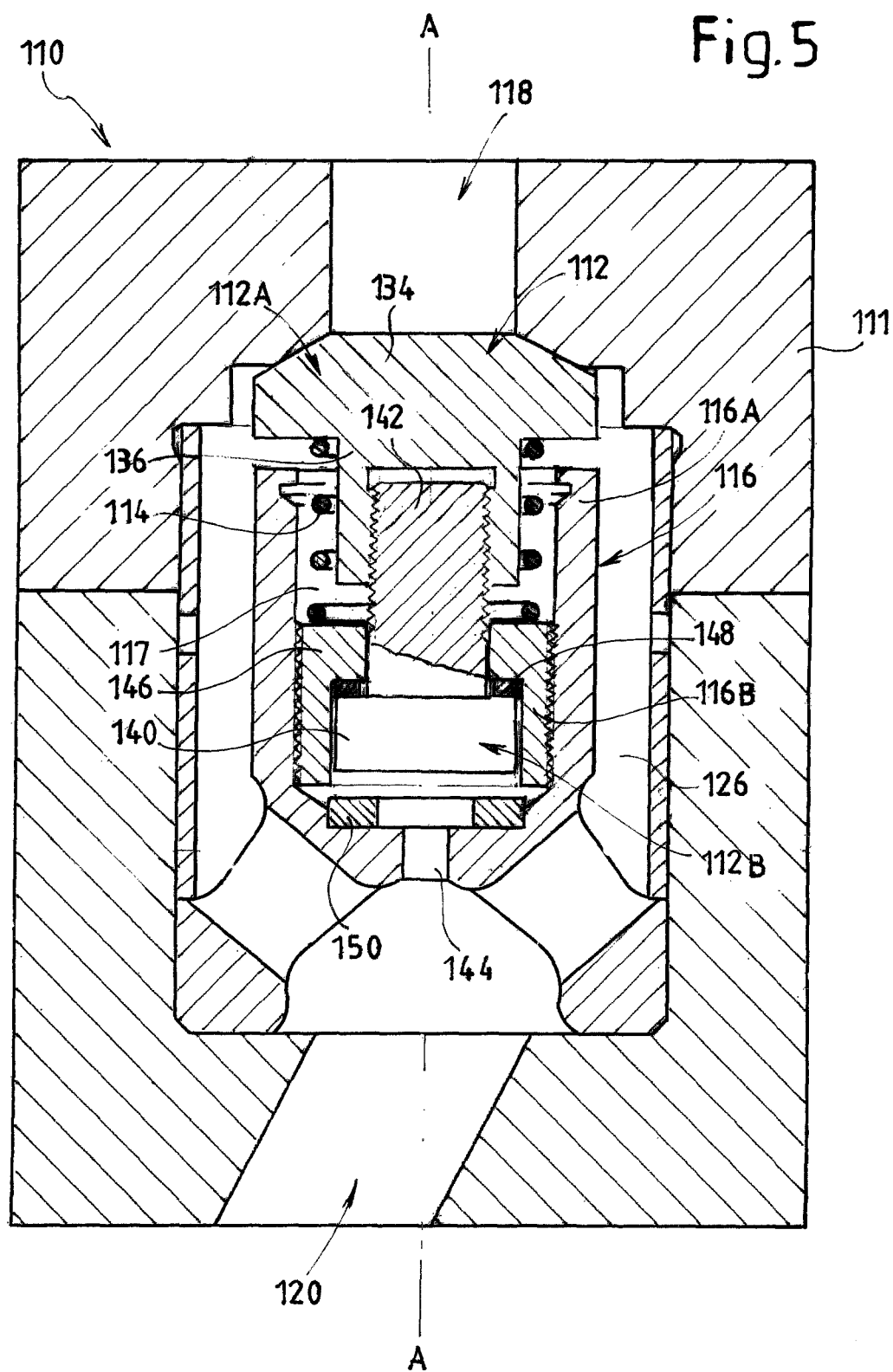
FIG. 5 illustrates the poppet valve of FIG. 4 in a closed position.

Each poppet valve 110S, 110D can be designed as illustrated in the exemplary embodiment shown in FIGS. 4 and 5, where the poppet valve is designated 110 as a whole. FIG. 4 shows the poppet valve 110 in the open position and FIG. 5 shows the same poppet valve 110 in the closed position.

The poppet valve 110 includes a valve body 111 having a valve axis A-A, a poppet shutter 112, a biasing member 114 and a shutter guide 116. In the exemplary embodiments shown in the attached drawings the biasing member 114 comprises a helical compression spring. Different biasing members can be used, instead. In some embodiments not shown, the biasing member can comprise Belleville springs, for example. In other embodiments, the biasing member can comprise more than one helical spring, e.g. two helical springs in parallel, or combinations of different types of springs.

The poppet valve 110 also includes a flow inlet 118 and a flow outlet 120. In operation, the spring 114 biases the poppet shutter 112 away from the shutter guide 116 in a closed position where a portion 122 of a surface of the shutter 112 rests against a closure seat 124 formed by a surface portion of the valve body 111 (FIG. 5), thereby preventing gas from flowing from the flow inlet 118 to the flow outlet 120 or vice versa. When the force exerted on the poppet shutter 112 by the differential gas pressure across the valve is higher than the biasing force of the spring 114, the poppet shutter 112 is moved to the opened position (FIG. 4), thereby allowing gases to flow from the flow inlet 118 to the flow outlet 120 through flow passages 126 formed between the poppet shutter 112 and an inner surface of the valve body 111 as well as between the shutter guide 116 and the inner surface of the valve body 111, as illustrated by the arrows 128 in FIG. 4.

In the embodiment shown in FIGS. 4 and 5 the poppet shutter 112 comprises two portions 112A, 112B connected to one another, e.g. by means of an inner thread formed in a threaded hole of portion 112A and an outer thread formed on the portion 112B. In some embodiments a suitable glue can be used to block the two portions together, preventing accidental unscrewing thereof due e.g. to vibrations induced by the dynamic stresses to which the poppet shutter 112 is subject during use. The two portions can be disassembled by using a suitable solvent to remove the glue before unscrewing the two portions 112A, 112B from one another.

The two portions 112A, 112B of the poppet shutter 112 therefore behave as a single integrally formed poppet shutter body. The surface portion 122 of the poppet shutter 112 co-acting with the closure seat 124 of the valve body 111 to close the gas passage is provided on the shutter portion 112A, which comprises a first head 134 and a central narrower projection 136 with a blind threaded hole 138 formed therein. The shutter portion 112B comprises a second head 140 and a stem 142 extending from the second head 140 towards the shutter portion 112A. The stem 142 is outwardly threaded and is screw-engaged in the threaded hole 138 of the shutter portion 112A. The poppet shutter 112 is thus formed as a double-headed elongated body, the first head 134 and the second head 140 being connected by an intermediate connection formed by stem 142 and projection 136.

In some embodiments, also the shutter guide 116 comprises a first outer portion 116A and a second inner portion 116B connected to one another, e.g. by means of an inner thread formed in the first outer portion 116A and an outer thread formed on the second inner portion 116B. The first and second guide portions 116A, 116B are screwed together to form the shutter guide 116. Unscrewing is prevented e.g. by gluing the two portions 116A, 116B together. The guide portion 116A is cup-shaped with an opening 144 facing the flow inlet 118 and a discharge opening 142 facing the flow outlet 120. The inner portion 116B is shaped as a cylindrical body with an inner annular flange 146, in which the stem 142 of the shutter portion 112B is slidingly engaged for axial movement along the axis A-A of the valve body 111. The inner portion 116B is housed in an inside cavity 117 formed in the first outer guide portion 116B. The shutter guide 116 therefore generally forms an inside chamber with a narrower section formed by the inner annular flange 146. The poppet shutter 112 is slidingly guided in the narrower passage formed by the inner annular flange 146. Additionally or alternatively the poppet shutter can be slidingly guided by the second head 140 along the inner surface of the second guide portion 116B, provided beyond the inner annular flange 146.

The spring 114 is disposed between the first head 134 of the first shutter portion 112A and the inner annular flange 146 formed on the second guide portion 116B.

In one embodiment, a first damper 148 is arranged between the head 140 of the second shutter portion 112B and an annular abutment formed by the inner annular flange 146 of the second inner guide portion 116B. In the exemplary embodiment the damper 148 is in the form of a ring with a rectangular cross-section, made e.g. of a suitably shock-absorbing material, e.g. an elastic or resilient material. In some embodiments, the damper can be made of an elastomeric material or a composite material, such as a fiber reinforced resin. A second damper 150 is arranged in the bottom of the first outer shutter guide portion 116A. In the embodiment shown in the drawing, the second damper 150 is in the form of a ring with a rectangular cross-section to allow gas flow through the discharge opening 144. Similarly to the first damper 148, the second damper 150 is preferably made of suitably shock-absorbing material, e.g. an elastic material. For example, the second damper 150 can be made of an elastomeric material or composite material.

Both dampers 148, 150 are arranged in the inside chamber formed by the shutter guide 116, such as to allow the dampers to move with respect to the shutter guide 116 without any risk of loosing the damper.

The construction of both the poppet shutter 112 and the shutter guide 116 in two portions 112A, 112B and 116A, 116B respectively allows the poppet shutter 112 to be properly guided by the shutter guide 116 and at the same time the dampers to be easily assembled in the shutter guide 116.

When the poppet shutter 112 moves according to double arrow 112 under the differential pressure across the valve 110, the dampers 148 and 150 reduce the impact force when the poppet shutter 112 impacts against the closure seat 124 and the shutter guide 116 upon closing and opening, respectively. More specifically, when the valve 110 closes, the first damper 148 absorbs at least part of the kinetic energy of the poppet shutter 112 when the head 140 of the shutter portion 112B abuts against the first damper 148, thus reducing the energy dissipation on the surfaces 122 and 124. During the opening movement, the head 140 of the shutter portion 112B collides against the second damper 150, which absorbs the kinetic energy of the poppet shutter 112, thus again reducing the impact shock.

A further embodiment of the invention is illustrated in FIG. 6, where the poppet valve 110 is shown in a longitudinal section and in open position. The poppet valve 110 includes a valve body 111, a poppet shutter 112, a biasing member, such as a helical compression spring 114, and a shutter guide 116. The poppet shutter 112 has an inner cavity 113 in which a spacer 115 is arranged. The shutter guide 116 has an inner chamber 117, with a side wall 117A, along which the poppet shutter 112 is slidingly guided. The spring 114 is partly housed in the cavity 113 and partly projects there from and extends towards a bottom 117B of the inner chamber 117 of the shutter guide 116.

The poppet valve 110 further comprises a flow inlet 118 and a flow outlet 120. The spring 114 biases the poppet shutter 112 away from the shutter guide 116 in a closed position with a surface portion 122 of the poppet shutter 112 sealingly engaging with a closure seat 124 of the valve body 111 thereby preventing gas from flowing from the flow inlet 118 to the flow outlet 120 or vice versa. When the force exerted on the poppet shutter 112 resulting from the differential pressure across the valve is higher than the biasing force of the spring 114, the poppet shutter 112 is moved to the opened position (FIG. 6), thereby allowing gases to flow from the flow inlet 118 to the flow outlet 120 through flow passages 126 formed between the poppet shutter 112 and the valve body 111 as well as between the shutter guide 116 and the valve body 111, as illustrated by the arrows 128 in FIG. 6.

Similarly to FIGS. 4 and 5, also in the embodiment of FIG. 6 the poppet shutter 112 comprises a first shutter portion 112A and a second shutter portion 112B stably connected to one another, e.g. by screwing and gluing or in any other suitable way. The shutter guide 116 also comprises two portions 116A, 116B stably connected to one another, e.g. by screwing and gluing or in any other suitable way. The first shutter portion 112A forms a head 134 of the poppet shutter 112 and extends to also form, together with the second shutter portion 112B, a narrower projection extending in an inner chamber 117 of the shutter guide 116. As mentioned above, the first shutter portion 112A is connected to the second portion 112B e.g. by screwing. In one embodiment, the second shutter portion 112B has a hollow body. In some embodiments the hollow body is cylindrical. On the outer surface of the second shutter portion 112B an annular ridge 162 is provided. The annular ridge 162 is received in an annular seat 164 formed by the two portions 116A, 116B of the shutter guide 116. More specifically, in the embodiment illustrated in FIG. 6 the annular seat is formed by a cylindrical surface and a first shoulder of the first guide portion 116A, and by a second shoulder formed by the second guide portion 116B, opposing the First shoulder. The poppet shutter 112 is slidingly guided by the outer surface of the narrower portion thereof, which slidingly engages the inner surface 117A of the inner chamber 117 of the shutter guide 116, the inner surface 117A being formed by the inner surfaces of the first and second guide portions 116A, 116B located adjacent the annular seat 164. A first damper 148 and a second damper 150 are arranged on the two sides of the annular ridge 162. The dampers 148, 150 can be fixedly mounted on the poppet shutter 112, or on the shutter guide 116, or one on the poppet shutter 112 and one on the shutter guide 116. In some embodiments, the dampers 148, 150 can be mounted loosely such that they can axially move with respect to the shutter guide 116. The dampers 148 and 150 can be made of elastomeric material or a composite material, as disclosed with respect to the dampers 148, 150 described with reference to FIGS. 4 and 5.

Also in this embodiment, the partition of the poppet shutter 112 and of the shutter guide 116 in two portions 112A, 112B and 116A, 116B, respectively, facilitates the assembly of the valve. Moreover, the dampers 148, 150 arranged in the inner chamber 117 of the shutter guide 116, between the shutter guide 116 and the poppet shutter 112, are protected against direct contact with the inflowing gas.

When the poppet shutter 112 moves towards the closed position, the impact of the poppet shutter 112 against the closure seat 124 is damped by the annular ridge 162 striking against the First damper 148, such that at least part of the kinetic energy of the poppet shutter 112 is absorbed by the first damper 148. When the valve is opened, the poppet shutter 112 moves away from the flow inlet 118 and the closure seat 124 compressing the spring 116 until the annular ridge 162 abuts against the second damper ISO. The kinetic energy of the poppet shutter 112 is at least partly dissipated or absorbed by the second damper 150.

A further exemplary embodiment of a poppet valve according to the disclosed subject matter is illustrated in FIG. 7. The valve is shown in a longitudinal section and in an open position. The poppet valve 110 includes a valve body 111, a poppet shutter 112, a biasing member, e.g. a helical compression spring 114 and a shutter guide 116. The poppet shutter 112 has an inner cavity 113 in which a spacer 115 can be arranged. The shutter guide 116 has an inner chamber 117, with a side wall 117A along which the poppet shutter 112 is slidingly guided. The spring 114 is partly housed in the cavity 113 and partly projects therefrom and extends towards a bottom 117B of the inner chamber 117 of the shutter guide 116.

The poppet valve 110 also includes a flow inlet 118 and a flow outlet 120. The spring 114 biases the poppet shutter 112 away from the shutter guide 116 in a closed position with a surface portion 122 of the poppet shutter 112 sealingly engaging with a closure seat 124 of the valve body 111 thereby preventing gas from flowing from the flow inlet 1118 to the flow outlet 120 or vice versa. When the force exerted on the poppet shutter 112 by the differential pressure through the valve 110 is higher than the biasing force of the spring 114, the poppet shutter 112 is moved to the opened position shown in FIG. 7, thereby allowing gases to flow from the flow inlet 118 to the flow outlet 120 through flow passages 126 formed between the poppet shutter 112 and the valve body 111 as well as between the shutter guide 116 and the valve body 111, as illustrated by the arrows 128 in FIG. 7.

The poppet shutter 112 comprises two shutter portions 112A, 112B stably connected with one another. In some embodiments a screw 119 connects the two shutter portions 112A and 112B to one another. A damper 148 is engaged between the two shutter portions 112A, 112B. In the exemplary embodiment shown in FIG. 7 the first shutter portion 112A is approximately disc-shaped. The surface thereof facing the flow inlet 118 comprises a substantially frustum-conical surface portion 122 arranged to cooperate with the closure seat 124 of the valve body 111 to sealingly close the valve. In some embodiments the surface of the first shutter portion 112A facing towards the flow outlet 120 has a circular recess 112R in which the first damper 148 is housed. The recess is closed by the second portion 112B of the poppet shutter 112. With such arrangement, the damper 148 is substantially protected from the gas, which enters the flow inlet 118 and flows through the flow passage 126.

The surface 117A of the inner chamber 117 of the shutter guide 116 forms an annular shoulder 121 on which a second damper 150 is mounted. Also the second damper 150, housed in the inner chamber 117 of the shutter guide 116 is thus protected against direct contact with the flowing gas.

Both dampers 148 and 150 can be made of elastomeric material, or composite material such as a reinforced resin, as disclosed with respect to the dampers 148, 150 described with reference to FIGS. 4 and 5.

When the valve opens, the impact of the poppet shutter 112 against the shutter guide 116 is dampened by the second damper 150. Part of the kinetic impact energy is thus dissipated or absorbed by the second damper 150. When the valve closes, part of the kinetic impact energy is dissipated or absorbed by the first damper 148, which is located inside the poppet shutter 112, between the first and second shutter portion 112A, 112B.

By providing at least one damper configured and arranged to at least partly dissipate, i.e. absorb impact energy of the poppet shutter in a poppet valve when the poppet shutter closes or opens the flow inlet of the valve, the impact stress generated at each closing or opening movement of the poppet shutter is reduced. This in turn reduces impact fatigue and impact stress.

In some particularly advantageous embodiments, a second damper is also provided. The two dampers are configured and arranged to at least partly absorb or dissipate impact energy of the poppet shutter when the poppet shutter opens and closes the flow inlet.

The damper(s) can be arranged between the poppet shutter and a fixed surface integral to the shutter guide or the valve body. In some embodiments, at least one of the dampers can be disposed inside the poppet shutter itself.

In some embodiments the poppet shutter comprises two or more portions connected to one another. In some embodiments the poppet shutter is formed by two portions. The portions can be connected to one another, e.g. by screwing means or by any other suitable connection arrangement. The connection between the portions forming the poppet shutter is preferably reversible. Reversible should be understood as being such a connection, which allows the two portions of the poppet shutter to be disassembled again when this is required e.g. for maintenance or repairing purposes. When mutual connection of the portions of the poppet shutter is by means of screwing, a suitable gluing liquid can be provided to prevent accidental unscrewing of the portions of the poppet shutter when subject to dynamic stresses in use. Other connection means, such as soldering, or simple gluing can also be adopted. Screwing connection provides the advantage of allowing disassembly of the poppet shutter if required e.g. for maintenance, cleaning of repairing purposes.

In some embodiments the shutter guide comprises two or more portions connected to one another. In one embodiment the shutter guide is formed by two portions, which ca be screwed or otherwise connected to one another. Also in this case glue can be used to prevent accidental unscrewing of the two portions of the shutter guide. The connection is preferably reversible, where reversible is to be understood as indicated above in connection to the poppet shutter structure.

Forming the shutter guide and the poppet shutter in at least two portions makes assembling of the various valve portions easier. In some embodiments only one of the poppet shutter and the shutter guide are comprised of two or more portions. In other embodiments both the shutter guide and the poppet shutter are comprised of two or more portions.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A differential pressure poppet valve, the valve comprising:
    a valve body, the valve body having at least one flow inlet and at least one flow outlet;
    at least one shutter guide disposed inside the valve body;
    at least one poppet shutter guided by the shutter guide;
    at least one flow passage from the flow inlet to the flow outlet, the flow passage being formed between an inside surface of the valve body and an outside surface of the shutter guide and of the poppet shutter;
    at least one biasing member configured to bias the poppet shutter towards a closed position so as to block the flow passage through the flow inlet when the poppet shutter is in the closed position;
    at least a first damper comprising a ring of shock-absorbing material configured and arranged to at least partly dissipate or absorb impact energy of the poppet shutter when the poppet shutter impacts against the closure seat to close the flow inlet; and
    a second damper comprising a ring of shock-absorbing material, said second damper being configured and arranged to at least partly dissipate or absorb impact energy of the poppet shutter when the poppet shutter impacts against the shutter guide to open the flow inlet.

2. The poppet valve according to claim 1, wherein the shutter guide comprises an inside chamber and wherein the first damper is disposed in the inside chamber.

3. The poppet valve according to claim 1, wherein the shutter guide comprises an inside chamber and wherein the first damper and the second damper are disposed in the inside chamber.

4. The poppet valve according to claim 1, wherein the poppet shutter comprises a first shutter portion and a second shutter portion assembled together to form the poppet shutter.

5. The poppet valve according to claim 4, wherein the first shutter portion and the second shutter portion form a double-headed elongated body with a first head formed by the first shutter portion and a second head connected to one another by an intermediate connection, the intermediate connection being slidingly engaged in the shutter guide.

6. The poppet valve according to claim 1, wherein the shutter guide comprises a first guide portion and a second guide portion assembled together to form the shutter guide.

7. The poppet valve according to claim 6, wherein the second guide portion is disposed inside the first guide portion and is provided with an inner annular flange, the at least one biasing member resting on the annular flange and the annular flange forming a sliding seat for the poppet shutter.

8. The poppet valve according to claim 7, wherein the poppet shutter comprises a first shutter portion and a second shutter portion assembled together to form the poppet shutter, the first shutter portion and the second shutter portion forming a double-headed elongated body with a first head formed by the first shutter portion and a second head connected to one another by an intermediate connection, the intermediate connection being slidingly engaged in the shutter guide, and
wherein the intermediate connection between the first head and the second head is slidingly engaged in the seat formed by the annular flange and the at least one biasing member is disposed between the annular flange and the first head of the poppet shutter, the first head having a surface portion arranged to co-act with a closure seat provided on the valve body to block the flow passage through the flow inlet.

9. The poppet valve according to claim 8, wherein the first damper is arranged to act between the annular flange of the second guide portion and the second head of the poppet shutter and is positioned such that the second head of the poppet shutter impacts the first damper upon closing of the poppet shutter.

10. The poppet valve according to claim 9, further comprising a second damper, the first and second dampers being configured and arranged to at least partly dissipate or absorb impact energy of the poppet shutter when the poppet shutter opens and closes the flow inlet,
wherein the shutter guide comprises an inside chamber and wherein the first damper and the second damper are disposed in the inside chamber; and
wherein the second damper is arranged between the second head of the poppet shutter and a bottom of the inner chamber of the shutter guide and is positioned such that the second head of the poppet shutter impacts the second damper upon opening of the poppet shutter.

11. The poppet valve according to claim 1, wherein the shutter guide comprises an annular seat in which an annular ridge of the poppet shutter is slidingly engaged.

12. The poppet vale according to claim 11, wherein the shutter guide comprises a first guide portion and a second guide portion assembled together to form the shutter guide; and wherein the poppet shutter comprises sliding surfaces on both sides of the annular ridge co-acting with corresponding sliding surfaces formed by the first guide portion and the second guide portion.

13. The poppet valve according to claim 12, wherein the annular seat is formed by a cylindrical surface and a first shoulder of the first guide portion and a second shoulder of the second guide portion opposing the first shoulder.

14. The poppet valve according to claim 1, wherein the shutter guide comprises an annular seat in which an annular ridge of the poppet shutter is slidingly engaged, and wherein the first damper and the second damper are arranged in the annular seat of the shutter guide on opposite sides of the annular ridge of the poppet shutter.

15. The poppet valve according to claim 4, wherein the first damper is disposed between the first shutter portion and the second shutter portion.

16. The poppet valve according to claim 15, further comprising a second damper, the first and second dampers being configured and arranged to at least partly dissipate or absorb impact energy of the poppet shutter when the poppet shutter opens and closes the flow inlet, wherein the second damper is arranged in an inner chamber of the shutter guide, in which the poppet shutter is slidingly engaged.

17. The poppet valve according to claim 16, wherein the inner chamber has a cylindrical surface slidingly engaging an outer surface of the poppet shutter and provided with a shoulder on which the second damper is arranged.

18. A hyper compressor comprising:
a cylinder;
a piston sliding in the cylinder;
a suction duct and a discharge duct;
at least one poppet valve arranged in the suction duct and in the discharge duct, the at least one poppet valve comprising:
a valve body, the valve body having at least one flow inlet and at least one flow outlet;
at least one shutter guide disposed inside the valve body;
at least one poppet shutter guided by the shutter guide;
at least one flow passage from the flow inlet to the flow outlet, the flow passage being formed between an inside surface of the valve body and an outside surface of the shutter guide and of the poppet shutter;
at least one biasing member configured to bias the poppet shutter towards a closed position so as to block the flow passage through the flow inlet when the poppet shutter is in the closed position;
at least a first damper comprising a ring of shock-absorbing material configured and arranged to at least partly dissipate or absorb impact energy of the poppet shutter when the poppet shutter impacts against the closure seat to close the flow inlet,
at least a second damper comprising a ring of shock-absorbing material, said second damper being configured and arranged to at least partly dissipate or absorb impact energy of the poppet shutter when the poppet shutter impacts against the shutter guide to open the flow inlet,
wherein the opening and closing of the poppet valves is controlled by differential pressure across the valve generated by the piston motion inside the cylinder.

19. The hyper compressor according to claim 18, operating at between 150 and 300 rpm.

20. The hyper compressor according to claim 18, operating at a discharge pressure between 800 and 4000 bar and preferably between 1500 and 3500 bar.

21. A method for reducing impact stresses in a differential pressure poppet valve comprising a valve body, the valve bed having at least one flow inlet and one flow outlet, at least one shutter guide disposed inside the valve body, at least one poppet shutter guided by the shutter guide, at least one flow passage from the flow inlet to the flow outlet, the passage being formed between an inside surface of the valve body and an outside surface of the shutter guide and of the poppet shutter, and at least one biasing member configured to bias the poppet shutter toward a closed position, so as to block the flow passage through the flow inlet, when the poppet shutter is in the closed position the method comprising:

providing at least a first damper comprising a ring of shock-absorbing material; absorbing, or dissipating through the first damper at least part of the impact energy of the poppet shutter when the poppet shutter impacts against the closure seat to close the flow inlet;

providing at least a second damper comprising a ring of shock-absorbing material; and absorbing or dissipating through the second damper at least a part of an impact energy of the poppet shutter when the poppet shutter impacts against the shutter guide to open the flow inlet.

22. A method for operating a reciprocating hyper compressor, the compressor comprising a cylinder; a piston sliding in the cylinder; a suction duct with a suction valve and a discharge duct with a discharge valve, each valve comprising at least one poppet shutter, and at least one biasing member configured to bias the poppet shutter toward a closed position, the method comprising:

providing at least a first impact damper co-acting with the poppet shutter, the at least a first damper comprising a ring of shock-absorbing material;

providing at least a second impact damper co-acting with the poppet shutter, the at least a second impact damper comprising a ring of shock-absorbing material;

reciprocatingly moving the piston in the cylinder to suck a gas in the cylinder at a suction pressure and discharge the gas from the cylinder at a discharge pressure;

selectively opening and closing the suction valve and the discharge valve by differential pressure across the valves; and at least partly dissipating or absorbing an impact energy against the closure seat of the poppet shutter upon a closing stroke of the poppet shutter by the at least first damper, at least partially dissipating or absorbing an impact energy of the poppet shutter against the shutter guide of the poppet shutter upon an opening stroked when the poppet shutter impacts the shutter guide by at the at least second damper.

23. The method according to claim 22, wherein the compressor is operated at between 150 and 300 rpm.

24. The method according to claim 22, wherein the discharge pressure is between 800 and 4000 bar and preferably between 1500 and 3500 bar.

\* \* \* \* \*